C. A. SIMMONS.
TOOL HOLDER.
APPLICATION FILED SEPT. 24, 1920.
1,380,744.
Patented June 7, 1921.
2 SHEETS—SHEET 1.
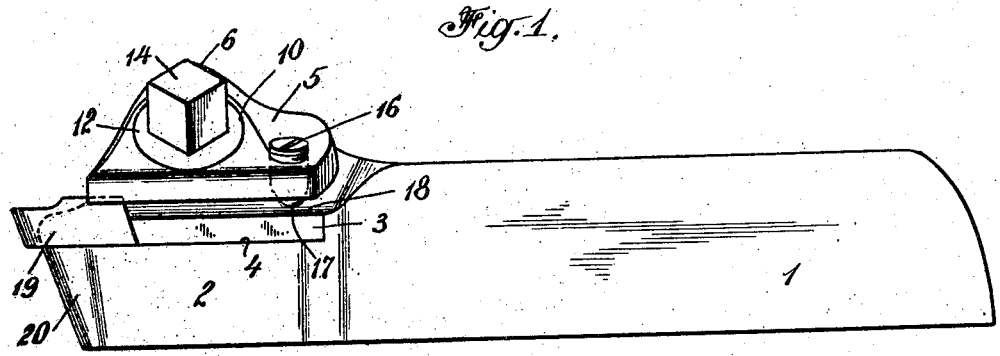
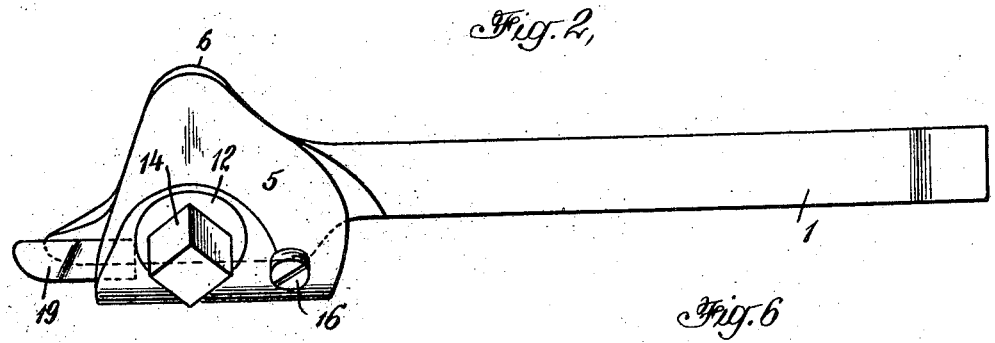
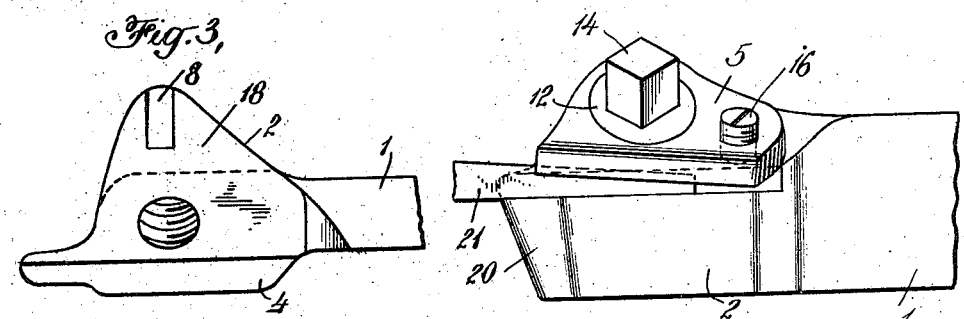
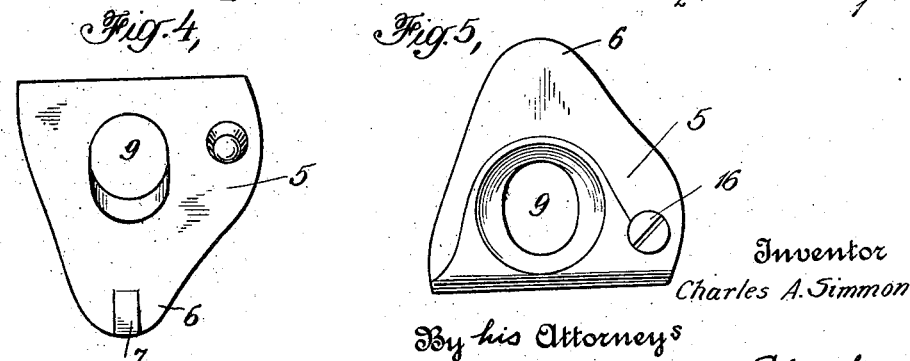
Inventor
Charles A. Simmons
By his Attorneys
Pennie, Davis, Marvin & Edmonds.

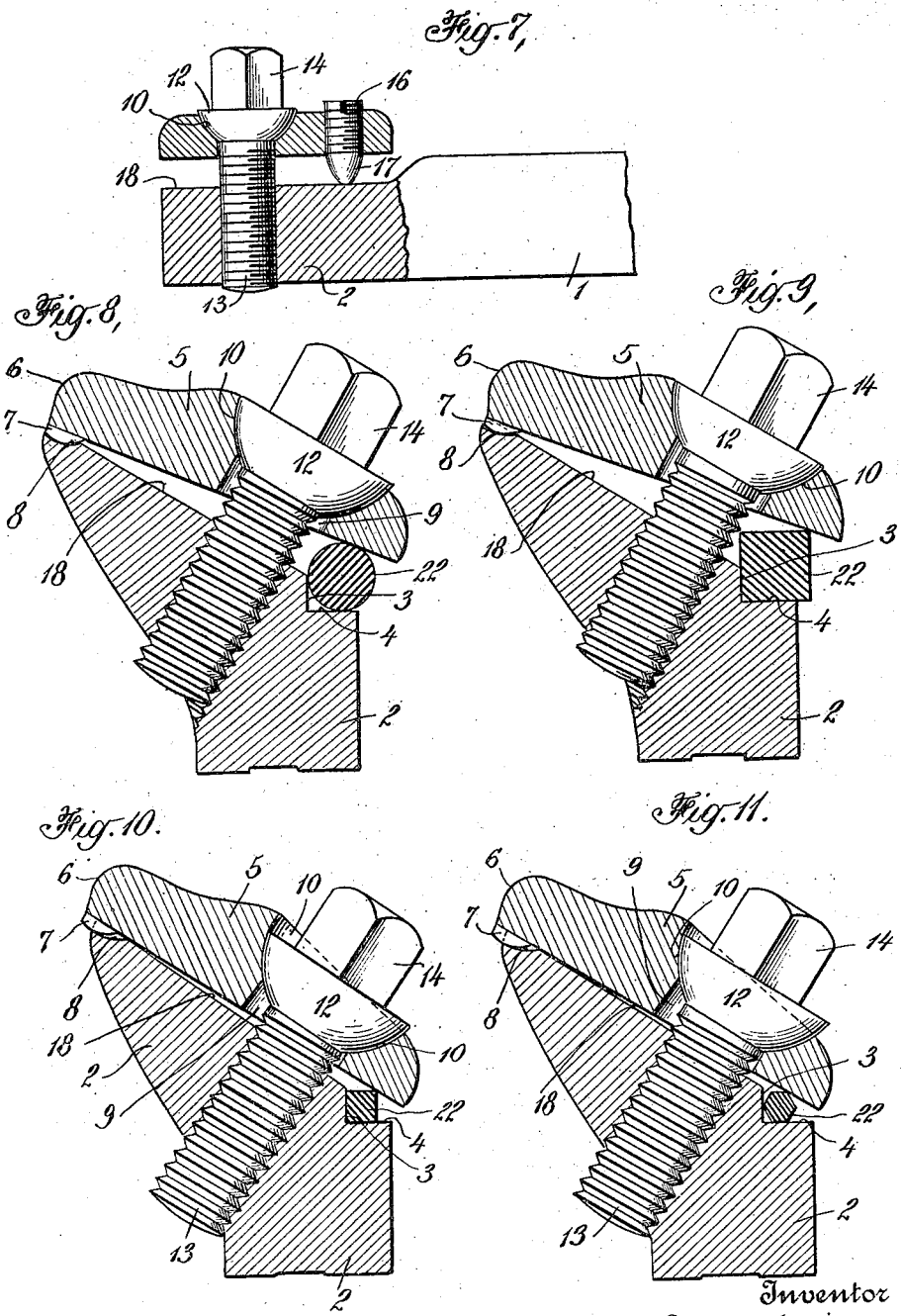

UNITED STATES PATENT OFFICE.

CHARLES A. SIMMONS, OF ALBANY, NEW YORK.

TOOL-HOLDER.

1,380,744. Specification of Letters Patent. Patented June 7, 1921.

Application filed September 24, 1920. Serial No. 412,463.

*To all whom it may concern:*

Be it known that I, CHARLES A. SIMMONS, a citizen of the United States, residing at 981 Broadway, Albany, in the county of Albany, State of New York, have invented certain new and useful Improvements in Tool-Holders; and I do hereby declare the following to be a full, clear, and exact description of the invention, such as will enable others skilled in the art to which it appertains to make and use the same.

In ordinary lathe work with machine tools the mechanic finds it necessary in completing a particular piece of work to use quite a variety of tools. In fact, even a simple piece of lathe work usually requires the use of a number of different kinds of tools, of different shapes and of different sizes and with different shaped shanks. For each tool the mechanic has to select the particular tool-holder adapted for holding that particular shape of tool and that particular size of tool. In other words, it is necessary to have a whole series of tool-holders to correspond with a series of tools of different sizes and of different shapes. The continual changing of tool-holders to accommodate the tools takes more or less time and of course requires that a large stock of tool-holders be kept on hand.

The principal object of this invention is to provide a tool-holder that will hold tools of various shapes, various sizes and with shanks of various shapes so that it will effectually grip practically any of the ordinary lathe tools. In other words, a single tool-holder according to this invention, by virtue of its ability to grip any tool commonly used in lathe work, will replace and fulfil the functions of a whole series of tool-holders that have heretofore been necessary when using tools of various sizes and shapes.

Lathe tools are commonly made of very expensive high speed steel. After these tools have been worn down so that they are only an inch or so in length, they have to be discarded because they are so short that they cannot be effectively held by the tool-holders which have heretofore been used. The scrapping of these bits of high speed steel represents a real economic loss in a machine shop.

It is another object of this invention, therefore, to provide a tool-holder which will firmly grip these very short pieces of tool steel, so that they can still be effectively utilized, and so that a very considerable amount of real service can be obtained from these pieces that heretofore had to be thrown away.

More specifically, the tool-holder of this invention has a body portion provided with a tool-holding recess and a clamping plate arranged to force the tool into the corner of this tool-holding recess and hold it there firmly. The clamping plate is preferably made flat on its under-side and is held in clamping position by a bolt with a spherical bearing that engages with a spherical seat in the clamping plate. The clamping plate is fulcrumed on the body portion so that it has a small degree of movement, transverse with respect to the line of the tool-holding recess. Such a movement of the clamping plate is necessary in order that the spherical bearing of the clamping bolt may be effectively seated in the spherical seat of the clamping plate when the tool-holder is gripping both large and small tools.

Other advantages and structural details will be apparent from the drawings illustrating the preferred embodiment of my invention, in which—

Figure 1 is a side view of the tool-holder showing it gripping a short piece of tool steel;

Fig. 2 is a top view of the same;

Fig. 3 is a top view of the body portion with the clamping plate removed;

Fig. 4 is a view of the under-side of the clamping plate;

Fig. 5 is a top view of the clamping plate;

Fig. 6 is a side view showing the tool-holder gripping a tool with a tapered shank;

Fig. 7 is a sectional view showing the clamping bolt and supplemental bearing screw; and Figs. 8 to 11 are sectional views showing the tool-holder gripping tools of various sizes and various shapes.

Referring now to the drawings, the tool-holder comprises a shank 1 and a body portion 2 which extends at an angle upwardly and outwardly with respect to the body portion at an angle of from about 20 to about 50 degrees. The exact angle is not important. The body portion 2 is provided with an angled tool-holding recess preferably right-angled, the side and bottom walls of which are indicated at 3 and 4 respectively. The exact shape of this tool-holding recess may, of course, be varied considerably without departing from the invention.

The clamping plate 5 is more or less triangular in shape and at one end, such as 6, it is fulcrumed on the extreme upper end of the body portion 2. The fulcrum is formed by an arcuate lug 7 on the underside of the plate 5 which is rockable in a coöperating arcuate slot 8 in the body portion 2. It is important to note that this fulcrum will allow the clamping plate 5 to move transversely with respect to the line of the tool-holding recess for a purpose that will be explained more fully. This lateral or transverse movement may be seen by a comparison of Figs. 8 and 10 of the drawing. The details of this fulcrum may, of course, be varied, as long as the construction is such as to allow this lateral movement of the clamping plate.

The clamping plate 5 is provided with an enlarged elongated hole 9 as shown in Figs. 4 and 5, which merges into a somewhat larger aperture 10, the walls of which are curved to form a spherical seat for the spherical bearing 12 of the clamping bolt 13. As is apparent from Figs. 8 to 11, the hole 9 is large enough to allow considerable play to the clamping bolt 13, so that it may assume various positions with respect to the clamping plate without binding against the walls of the hole. The clamping bolt may be provided with the usual squared head 14. The bolt 13 is canted at a rather sharp angle as shown in Figs. 8 to 11, so as to cause the clamping plate to force the tool into the angle of the tool-holding recess, against both walls.

In order that this tool-holder may be used to grip very short tools, such as would ordinarily have to be scrapped because too short to be effectively gripped in the ordinary tool-holder, there is provided a supplemental bearing device located to one side of the line drawn through the clamping bolt and the fulcrum. This supplemental bearing device is here shown as a headless set screw 16 provided with a ball point 17 adapted to bear against the upper surface 18 of the body portion 2. As will be apparent from Figs. 1 and 2 this set screw is well to one side of the line through the fulcrum of the clamping plate and the clamping bolt, and is positioned inwardly with respect to the short piece of tool indicated at 19, Fig. 1. There is thus provided a three point bearing for the clamping plate 5, these three points being the fulcrum, the clamping bolt and the set screw. A supporting shoulder 20 is formed on the end of the body 2 to support the tool. If now a short piece of tool, say about ¾ of an inch long, is put in the tool-holding recess, the inner end of the clamping plate is supported by the supplemental set screw, while the outer end has a firm, even contact with the short piece of tool so that it is firmly and effectively held in operative position. The ability of this tool-holder to utilize these small pieces of high speed tool steel is an important feature of this invention.

The ability of this tool-holder to grip tools of various sizes and various shapes is well illustrated in Figs. 6 and 8 to 11, inclusive. In Fig. 6 the holder is shown as gripping a tool that has a tapered shank 21. This tapered shank may be either round or may have flattened sides, the one shown in Fig. 6 having flattened sides. Either shape will be effectively gripped and held by the clamping plate. In the particular instance shown in Fig. 6, it is not necessary to use the supplemental bearing 16.

Referring now to Figs. 8 to 11, the holder is shown as gripping four different tools 22 of various sizes and various cross-sectional shapes. Whatever the shape of the tool or tool shank it is pressed by the flat under surface of the clamping plate into the corner of the tool-holding recess so that when the clamping bolt 13 is tightened it is effectively held there. When a tool of rather small cross-section is used, the clamping plate 5, as shown in Figs. 10 and 11, rocks with respect to the clamping bolt so that the spherical seat of the plate and the spherical bearing of the bolt still remain in firm engagement. This rocking movement is permitted by the provision of the enlarged hole 9. Furthermore, when a rather small tool is being used, the clamping plate 5 has to move a short distance in a direction transverse to the direction of the tool-holding recess and away from it, in order that the tool may be firmly and evenly gripped and in order that the engagement between the spherical seat and the spherical bearing may be a firm one. The extent of this movement, as shown in Figs. 10 and 11, is a rather small one, but nevertheless, it is important and the fulcrum of the clamping plate should be such as to allow this movement. The provision of the arcuate tongue-and-groove-fulcrum permits a rocking movement of the plate 5 with respect to the body portion 2 of the tool-holder and also aids in the accurate positioning of the clamping plate on the body portion 2.

While I have illustrated a preferred embodiment of my invention, it should of course be understood that the particular design of the parts may be changed as defined within the scope of the following claims.

1. A tool holder for holding tools of varying sizes, of round, square or other shape in cross section and with plain or tapered shanks, comprising a body portion provided with an angled tool holding recess, a clamping plate to force the tool into the angle of the tool holding recess, fulcrumed on the body portion so as to permit of a small transverse movement, the plate being provided with a spherical seat and with an enlarged hole to allow for the play of a clamping bolt, and a clamping bolt with a spherical bearing passing through the hole and engageable in the seat.

2. A tool holder for holding very short tools and tools with plain or tapered shanks of various shapes and various sizes, comprising a body portion provided with an angled recess for the tool or tool shank, a clamping plate for forcing the tool or tool shank into the angle of the recess, so fulcrumed on the body portion as to permit the plate to move transversely with respect to the line of the said recess, the plate being provided with a hole and a spherical seat, a clamping bolt with a spherical bearing passing through the hole and engageable with the seat, and an adjustable bearing device engageable with the plate and body portion positioned to one side of the line through the fulcrum and the clamping bolt.

3. A tool holder for holding a short tool, comprising a body portion provided with a tool holding recess, a clamping plate fulcrumed on the body portion, a clamping bolt engageable with the body portion and the clamping plate, and an adjustable bearing device engageable with the body portion and the clamping plate positioned to one side of a line through the fulcrum and the clamping bolt.

4. A tool holder, comprising a body portion provided with an extension extending upwardly and outwardly at an angle of from 20 to 50 degrees, and further provided with a tool holding recess, a clamping plate fulcrumed on the extension, a clamping bolt engaging with the clamping plate, and a supplemental bearing device positioned to one side of the line through the fulcrum and the clamping bolt.

5. A tool holder for holding tools of various sizes, comprising a body portion provided with a tool holding recess, a clamping plate fulcrumed on the body portion so as to be movable transversely with respect to the tool holding recess, the clamping plate being provided with a spherically curved seat, and a clamping bolt, provided with a spherically curved bearing, engageable in said seat and in the body portion, for clamping a tool in the tool holding recess.

6. A tool holder comprising a body portion, provided with a tool holding recess, a clamping plate, fulcrumed on the body portion, provided with a spherically curved seat, the fulcrum comprising a lug and coöperating groove, one of which is carried by the clamping plate and the other by the body portion, said fulcrum permitting transverse movement of the clamping plate with respect to the tool holding recess, and a clamping bolt provided with a spherically curved bearing, engageable in said seat and in the body portion, for clamping a tool in said recess.

7. A tool holder comprising a body portion provided with a tool holding recess, a clamping plate fulcrumed on the body portion so as to allow the clamping plate to move transversely with respect to the tool holding recess, a clamping bolt for the clamping plate between the fulcrum and the tool holding recess, and a supplemental bearing device engageable with the body portion and clamping plate, positioned to one side of the line through the fulcrum and clamping bolt.

8. A tool holder for holding various sized tools, comprising a body portion provided with a tool holding recess running lengthwise thereof, a clamping plate fulcrumed on the body portion, so as to move transversely with respect to the tool holding recess as it is moved to a tool gripping position, a clamping bolt engageable with the clamping plate and the body portion, the fulcrum and clamping bolt being positioned so that a line through them is transverse with respect to the tool holding recess.

9. A tool holder for holding various sized tools, comprising a body portion provided with a tool holding recess running lengthwise thereof, a clamping plate fulcrumed on the body portion so as to move transversely of the tool holding recess as it is moved to a tool clamping position, the clamping plate being provided with a spherically curved seat, a clamping bolt provided with a spherically curved bearing, engageable in said seat and in the body portion, the clamping bolt and fulcrum being positioned so that a line through them is transverse with respect to the tool holding recess.

In testimony whereof I affix my signature.

CHARLES A. SIMMONS.